(12) United States Patent
Schroit et al.

(10) Patent No.: US 11,608,697 B2
(45) Date of Patent: Mar. 21, 2023

(54) SYSTEM FOR THE OPERATIONAL AND PERFORMANCE EFFICIENCY IMPROVEMENT OF WIRELINE TRACTORS

(71) Applicants: Sam Schroit, Houston, TX (US); Jeffrey Wensrich, Houston, TX (US)

(72) Inventors: Sam Schroit, Houston, TX (US); Jeffrey Wensrich, Houston, TX (US)

( * ) Notice: Subject to any disclaimer, the term of this patent is extended or adjusted under 35 U.S.C. 154(b) by 0 days.

(21) Appl. No.: 16/462,239

(22) PCT Filed: Nov. 20, 2017

(86) PCT No.: PCT/US2017/062651
§ 371 (c)(1),
(2) Date: May 19, 2019

(87) PCT Pub. No.: WO2018/094368
PCT Pub. Date: May 24, 2018

(65) Prior Publication Data
US 2019/0316433 A1   Oct. 17, 2019

Related U.S. Application Data

(60) Provisional application No. 62/446,512, filed on Jan. 15, 2017, provisional application No. 62/424,544, filed on Nov. 21, 2016.

(51) Int. Cl.
| | |
|---|---|
| *E21B 23/00* | (2006.01) |
| *F16H 1/22* | (2006.01) |
| *F16H 48/20* | (2012.01) |
| *H02K 7/116* | (2006.01) |
| *E21B 17/10* | (2006.01) |

(Continued)

(52) U.S. Cl.
CPC .............. *E21B 23/00* (2013.01); *F15B 11/16* (2013.01); *F16H 1/22* (2013.01); *F16H 48/20* (2013.01); *H02K 5/132* (2013.01); *H02K 7/116* (2013.01); *H02K 9/193* (2013.01); *E21B 17/1021* (2013.01); *E21B 23/001* (2020.05); *F15B 2211/465* (2013.01); *F15B 2211/7053* (2013.01); *F15B 2211/71* (2013.01)

(58) Field of Classification Search
CPC . F16H 2048/20; E21B 17/1021; E21B 23/001
See application file for complete search history.

(56) References Cited

U.S. PATENT DOCUMENTS

| | | | | |
|---|---|---|---|---|
| 3,227,290 | A | * | 1/1966 | Lemelson ................ B25J 18/06 901/14 |
| 5,142,989 | A | * | 9/1992 | Suzumori ............ G21C 17/017 104/138.2 |

(Continued)

FOREIGN PATENT DOCUMENTS

JP    5814079 B2  *  11/2015

*Primary Examiner* — Blake Michener
*Assistant Examiner* — Theodore N Yao

(57) ABSTRACT

The invention discloses systems for improving performance and operational efficiency of wireline tractors. A cooling system improves power capabilities of electrical motors mounted in wheels, which are mounted on a linkage pivotably connected to an arm extended from a tractor tool body, in an in-line arm configuration. The linkage and arm mechanism significantly improve the tractor's ability to traverse wellbore obstructions. The hydraulic system of the tractor ensures adequate wellbore centralization.

7 Claims, 21 Drawing Sheets

(51) Int. Cl.
     *F15B 11/16*      (2006.01)
     *H02K 5/132*      (2006.01)
     *H02K 9/193*      (2006.01)

(56)            References Cited

U.S. PATENT DOCUMENTS

| | | | |
|---|---|---|---|
| 2005/0103538 A1* | 5/2005 | Cotton | F16L 55/265 |
| | | | 180/9.1 |
| 2005/0145415 A1* | 7/2005 | Doering | E21B 4/18 |
| | | | 175/24 |
| 2007/0000406 A1* | 1/2007 | Stout | F16L 55/32 |
| | | | 104/138.2 |
| 2008/0167752 A1* | 7/2008 | Jacobsen | B62D 57/024 |
| | | | 700/250 |
| 2013/0068479 A1* | 3/2013 | AlDossary | E21B 4/18 |
| | | | 166/381 |
| 2016/0223123 A1* | 8/2016 | Choi | F16L 55/32 |
| 2019/0040698 A1* | 2/2019 | Fuglestad | E21B 23/14 |
| 2019/0048976 A1* | 2/2019 | Armstrong | E21B 23/14 |

* cited by examiner

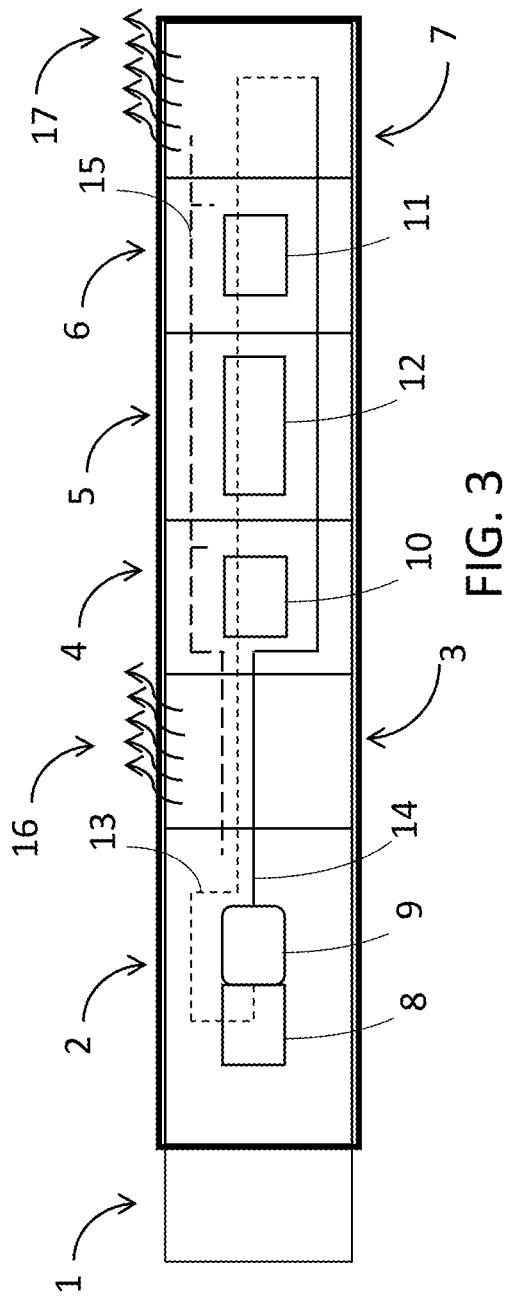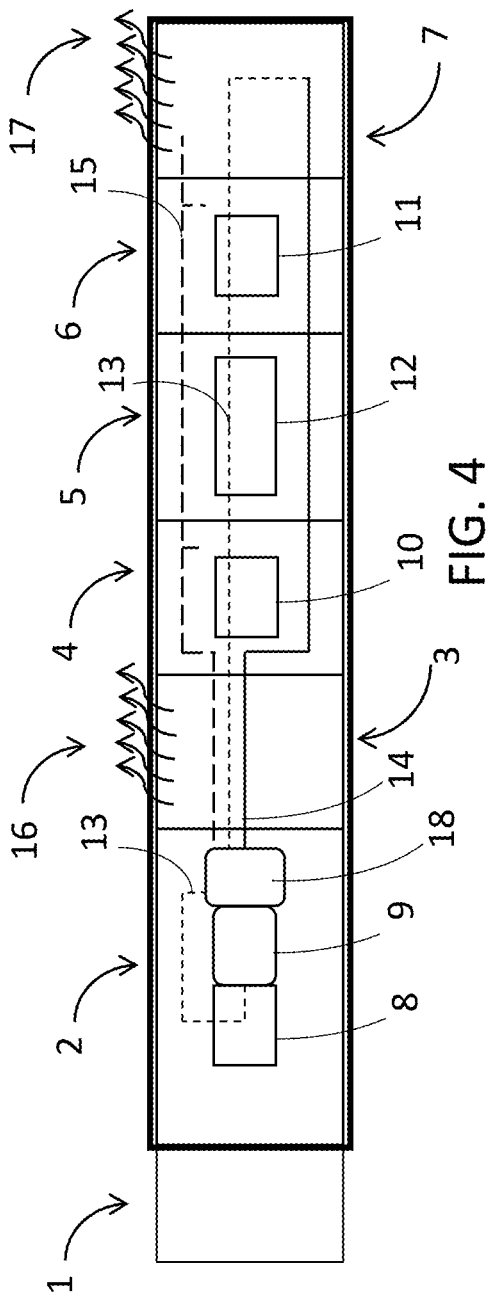

SYSTEM FOR THE OPERATIONAL AND PERFORMANCE EFFICIENCY IMPROVEMENT OF WIRELINE TRACTORS

The invention discloses systems for improving performance and operational efficiency of wireline tractors. A cooling system improves power capabilities of electrical motors mounted in wheels, which are mounted on a linkage pivotably connected to an arm extended from a tractor tool body, in an in-line arm configuration. The linkage and arm mechanism significantly improve the tractor's ability to traverse wellbore obstructions. The hydraulic system of the tractor ensures adequate wellbore centralization.

FIELD

Embodiments described relate to tractors for advancing equipment through an underground well. In particular, embodiments of a system which improves operational and performance efficiency of wireline tractors.

BACKGROUND

Wireline tractor operations may be employed to deliver a downhole tool to an operation site for a variety of well intervention applications such as well stimulation, the creation of perforations, the clean-out of debris from within a well or the characterization of a formation. Wireline tractors often need to conduct these operations in well environments with high temperatures, high pressures, debris and non-uniform wellbores or well casing bores. Thus, the state of the art can continually advance in these areas to improve wireline tractor service and operation.

Wireline tractors and other downhole tools commonly have electrical components and systems for the tools' operation. For example; batteries, transistors, transformers and electrical motors. These components have an environmental temperature limitation in which they can function. Electrical motors all have operating temperature limitations. A motor may be able to operate above its continuous operation temperature limit for short periods of time. A motor may also have different operating regimes of torque and speed capabilities for different temperatures.

For example, a motor may achieve a torque of about 0.08 Nm at 175 Celsius but that same motor may also be able to operate above 0.1 Nm if at 125 C. When down hole tools that use electrical motors, such as cutting tools, milling tools, tractor tools and others, are operated downhole, it is beneficial to keep motors cool to not exceed the temperature rating of the motor, thereby preventing failure and allowing for an opportunity to drive the motor at a higher level of torque or power.

Motor output power is increasingly limited as the motor ambient environment temperature approaches the motor temperature limit. This limits the power draw over time that can be utilized from the motor before exceeding its temperature limits. Certain downhole wireline tractors on the market have significant challenges with this effect and managing heat with the tractor motor system. These tractors very often need to stop the downhole operation, to allow the motor or motors to cool down to, or closer to, the ambient well temperature to avoid damage or failure. This is especially seen in systems in which the full power provided to the tool is supplied to one motor where generated heat dissipation is difficult. It is known in the field to utilize materials for packaging electrical motors with high heat transfer coefficients to more effectively transfer heat generated from the motor to the ambient and cooler environment outside the tool. In many cases, this is not a sufficient method of heat management.

Motor windings today are commonly available with temperature ratings above 200 Celsius and some as high as 260 Celsius. Well environments above 200 Celsius are less common than those below 200 Celsius so one would think that there is not a need for technological advancement or invention. However, no electrical motor or electrical component is 100% efficient and therefore, energy losses present as heat. For example, if a 100-watt motor is 80% efficient, 20 watts of heat will cause the motor operating temperature to rise if the heat is not dissipated or extracted from the vicinity of the motor.

Two sources of heat influence downhole electrical components and motors; the ambient operating environment or well temperature and heat generated by the motor or component itself due to inefficiency. Removing heat generated by the electrical component or motor inefficiency will then leave the motor to deal with temperature of its environment alone or other heat generating sources in the downhole tool and allow the motor or electrical components to operate at lower temperature and under loads, i.e. torque, for periods of time greater than if heat in the system were not removed.

Oil and gas wells are characterized by varying hole size and profiles. Obstacles, for example, changes in hole size and profile; debris accumulation and perforation holes present challenges for wireline tractors to negotiate through.

Wheeled wireline tractors are seen in two basic configurations, those with in-line arms and those with side-by-side arms. Each configuration has various advantages which the other does not have. When a wheeled tractor impacts an obstacle, for the wheel to drive over the obstacle, the wheel must be driven with an increased amount of torque. If the torque required for a wireline tractor wheel to drive over an obstacle is greater than can be provided by the wheel's drive motor, the tractor will likely stall. For in-line arm tractors, one wheel will impact a given obstacle such as a casing joint, at a given moment. A tractor with side-by-side arms, if the arms are of equal length, the wheels of those arms will likely impact a casing joint at the same time. If one motor drives both wheels in a set of side-by-side arms, the motor will need to provide sufficient torque such that both wheels will pass through the casing joint at the same time. If two wheels are driven by the same motor in an in-line arm tractor, the drive motor will need to provide sufficient torque such that one wheel will pass through the casing joint. Thus, in general, an in-line arm tractor's motor, if it drives two wheels, will need to be capable of a lower torque as compared to a side-by-side tractor's motor which drives two wheels of a set of arms of equal length.

Side-by-side arm tractors in which each set of arms are mechanically linked, provide for optimal centralization in the wellbore with the least number of wheels. This is achieved due to the directly opposing forces as a pair of arms are actuated radially from the tool to contact the wellbore. In an in-line arm configuration, the radial forces applied to the wellbore are not directly opposing, requiring a greater number of wheels for optimal centralization.

If the wheels of an in-line arm tractor are driven by transmitted power from an electrical motor through a power transmission, for example a gear train, chain or combination thereof, a hydraulic pump in the system would have difficulty providing sufficient fluid volume to an actuator which were required to actuate an individual arm or linkage in the tractor to apply the wheel to the wellbore, unless the flow from a hydraulic pump was sufficiently high such that the resting inertia where overcome to lift the tool off the bottom of a horizontal wellbore from a closed-arms state. If a hydraulic pump provided hydraulic power to more than one actuator on a common hydraulic bus from the pump to every in-line arm as in a tractor, the flow would choose the arm with the least resistance. This would cause the arms not positioned to actuate towards the side of the tool resting on the wellbore to actuate first until fully open or until contact with the wellbore is achieved. The arms positioned to pivot toward the wellbore resting side of the tool would then not actuate and not lift the tool to centralize in the wellbore.

If a hydraulic power source is used to actuate in-line arms, the flow of hydraulic fluid must be controlled to each arm such that tool can sufficiently centralize in the wellbore.

SUMMARY

In order to address challenges of thermal management for downhole tools and wireline tractors, an active thermal management system may be employed. That is, a system for removing fluid internal to the tractor from an area where heat generation is occurring due to inefficiencies in electrical components such as electrical motors, is pumped to an area where heat generation is not occurring and more suitable for heat transfer to the ambient well environment.

Furthermore, methods are provided for the removal of heat from downhole tools in operation.

In order to address challenges of side-by-side arm configured tractors negotiating through obstacles two wheels per arm with a differential linking the two wheels may be employed. That is, a side-by-side arm tractor would benefit by employing multiple wheels per arm, with a differential drive linking the wheels, such that when the downhole wheel impacted an obstacle, torque would be transferred to the up-hole wheel which has yet to impact the obstacle and when the downhole wheel traversed the obstacle and the up-hole wheel impacted the obstacle, torque would be transferred to the downhole wheel.

In order to address the challenge of adequately centralizing an in-line arm tractor a hydraulic system with flow control to actuate pistons for each arm may be employed, thus ensuring that no matter their initial position within the wellbore, every arm of the tractor is actuated to an equivalent radial position.

BRIEF DESCRIPTION OF THE DRAWINGS

FIG. 3 represents a downhole tool which comprises several tool sections which are contained in common housing. Together the sections compose an active cooling system for cooling components in the downhole tool.

FIG. 4 represents a downhole tool which comprises several tool sections which are contained in common housing. Together the sections compose an active cooling system for cooling components in the downhole tool. This downhole tool comprises and additional heat exchanging section.

DETAILED DESCRIPTION OF THE INVENTION

Figure 1:
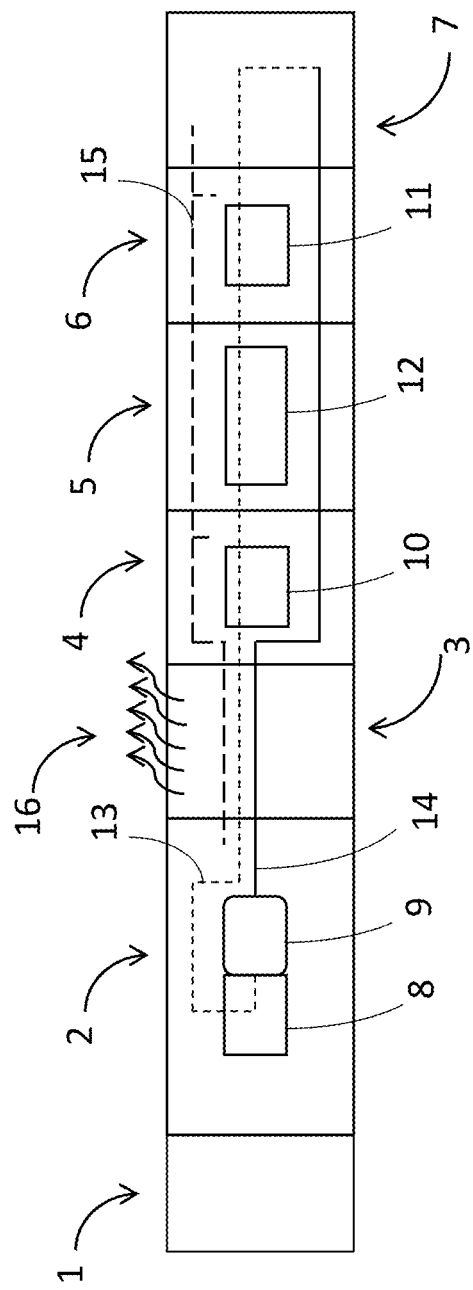
FIG. 1 represents a downhole tool which comprises several tool modules. Together the modules compose an active cooling system for cooling components in the downhole tool.

The present invention will be described in connection with its preferred embodiments. However, to the extent that the following description is specific to a particular embodiment or a particular use of invention, this is intended to be illustrative only, and is not to be construed as limiting the scope of the invention. On the contrary, the description is intended to cover all alternatives, modifications, and equivalents that are included within the spirit and scope of the invention, as defined by the appended claims.

The present invention describes a system to improve the operational and performance efficiency of downhole tractors. The benefits of reducing the temperature of electrical motors and electrical components are numerous. For downhole tractors and other mechanical intervention tools cooling motors within these tools can substantially increase their power output capability. Cooling also increases the life of materials susceptible to degradation by exposure to heat. Additionally, cooling materials can allow a designer to design near the ultimate strength of the material, without necessitating a de-rating factor for the material at high temperature. In an embodiment, a downhole tool comprises several tool modules or sections which may consist of one or more of; a cable head; hydraulic module including an electrical motor which powers a hydraulic pump. The pump may provide hydraulic fluid into a hydraulic line which is routed through a heat exchange section; through a motor section, which may comprise an electrical motor; through an electronics section, which may contain a motor controller; and into an accumulator section. From the accumulator section, a hydraulic line may be routed into the opposite direction and returned by a hydraulic return line, through the motor section; through the electronics section; through an electrical motor in the motor section; through a heat exchange section and into hydraulic module; to the return port of hydraulic pump. As hydraulic fluid is pumped through the electrical motors, heat may be transferred to the hydraulic fluid which passes therethrough. Hydraulic fluid may enter the heat exchange section and heat may be transferred to the ambient wellbore environment.

In an embodiment, the hydraulic module may additionally provide hydraulic fluid via a hydraulic line to sections of the downhole tool for hydraulic actuation purposes.

In an embodiment, the accumulator section may also function as a heat exchange section to further manage heat generated within the downhole tool.

In an embodiment, the downhole tool modules are within a common housing, which together comprise a system for cooling components in the downhole tool.

In an embodiment, a temperature sensing device is disposed to sense the temperature of a heat generating component within the downhole tool.

In an embodiment, a temperature sensing device is disposed to sense the heat of a hydraulic passage or other passage.

In an embodiment, a parameter sensing device is disposed to sense a parameter of a heat generating component.

In a further embodiment, a second temperature sensing device is disposed to sense a second temperature within the downhole tool or exterior the downhole tool.

In a further embodiment, a second parameter sensing device is disposed to sense a second parameter within the downhole tool or exterior the downhole tool.

In an embodiment one or more parameter sensing devices are disposed to provide communication with an electrical controller within the electronics section.

In an embodiment, the downhole tool further comprises a hydraulic control block disposed to received hydraulic fluid from the hydraulic pump. The hydraulic control block may include hydraulic components which may control one or more of; flow, pressure and direction of the hydraulic fluid.

In an embodiment, the hydraulic control block contains hydraulic components selected from one or more of; solenoid valves, check valves, relief valves, pilot-operated check valves, shuttle valves, flow regulators, pressure regulators or other hydraulic components.

In an embodiment, one or more of the hydraulic components within the hydraulic control block may reside in another portion of the downhole tool, exterior the hydraulic control block.

In an embodiment, a hydraulic control circuit is provided which includes functionality to provide hydraulic fluid for actuation of pistons and for thermal management purposes. A pump may deliver hydraulic fluid to one or more fluid regulators disposed to regulate flow for each purpose. On the actuation side of the hydraulic control circuit, a set of solenoid valves and pilot operated check valves may be operated to control the direction of flow to a corresponding actuation and retraction of pistons, thereby allowing for continuous thermal management with the ability to simultaneously control actuation pistons.

In a preferred embodiment, one or more flow passages are disposed to receive fluid from the outlet of the hydraulic pump. A solenoid valve may be disposed to control flow therethrough such that upon energizing the solenoid valve on a first passage, flow is blocked from entering a thermal management system and when a solenoid valve is energized on a second passage, flow is delivered to one or more actuation pistons.

In an embodiment, the pistons may be disposed to actuate one or more tractor arms.

In an embodiment, the pistons may be disposed to actuate one or more members to engage with the interior of a well bore.

In an embodiment, the flow through the electrical motors may flow through a rotor passageway, around or parallel to the long axis of the stator, through an annular space or any combination thereof.

In an embodiment, a method is provided for dissipating heat from within a downhole tool. The method comprises, delivering fluid from a pump outlet to a first hydraulic passage routed through one or more tool sections containing heat generating components; through one or more heat exchanging sections of the downhole tool disposed to dissipate heat to a region exterior the downhole tool; and to the pump intake.

In an embodiment, the method further comprises controlling the flow of the fluid to the first hydraulic passage.

In an embodiment, the method further comprises monitoring a parameter of a heat generating component within the downhole tool; controlling the flow of fluid to the first hydraulic passage based on the parameter of the component reaching a setpoint parameter. Optionally, a parameter of a non-heat generating component or material may be monitored within or exterior to the downhole tool. For example, the wellbore temperature may be monitored.

In an embodiment, the method comprises monitoring the temperature of a hydraulic passage; controlling the flow of fluid to the first hydraulic passage based on the temperature of the passage reaching a setpoint temperature.

In an embodiment, the method further comprises the parameter sensing device providing a signal to a controller such that the controller may deliver a signal to surface based on the parameter sensing device signal. Optionally, the controller may deliver a signal to a component within the downhole tool, for example, a motor coupled to a hydraulic pump or a solenoid operated valve, to control the flow of fluid to the first hydraulic passage.

The controller may be an analog circuit or a digital processor, such as an application specific integrated circuit (ASIC) or array of field-programmable gate arrays (FPGAs). Accordingly, embodiments may implement any one or more aspects of control logic in the controller that is on-board the downhole tool or in a computing system that is in data communication with the controller. A computing system may be located at the surface to provide a user-interface for monitoring and controlling the operation of the downhole tool and may be in data communication with the controller over a wireline cable.

In an embodiment, a second parameter sensing device signal is provided to the controller and the controller provides a signal to control the flow of fluid based on a comparison of signals provided by the first and second parameter sensing device.

In an embodiment, the method further comprises controlling the flow of fluid to a second hydraulic passage.

In an embodiment, the parameter is temperature.

In an embodiment, the parameter is current.

In an embodiment, the heat generating component is an electrical motor.

In an embodiment, the heat generating component is a battery.

In an embodiment, the heat generating component is a transformer.

In an embodiment, the heat generating component is a transistor.

In an embodiment, the heat generating components is a processor.

A downhole tractor tool may have in-line or side by side arms with powered wheels mounted to the ends of the arms and disposed to receive mechanical power to apply a traction force to a wellbore wall. In an embodiment, a linkage may be disposed at the end of each arm with a powered wheel at each end of the linkage. In this manner, the tractor is well suited to traverse obstructions within a wellbore. When a first wheel at an end of the linkage enters an obstruction, the second wheel may still be unaffected by the obstruction and thereby ensure that both wheels traverse the obstruction.

In an embodiment, the point at which the linkage is connected to the arm is off-center of the linkage.

In an embodiment, mechanical power is transmitted to the wheels by a gear train within the arm and disposed to receive mechanical power from a motor within the tractor. The gear train within the arm may transmit mechanical power to a gear train within the linkage.

In an embodiment, the gear train within the arm transmits power to a differential and each wheel powered by an output of the differential.

In an embodiment, a motor is disposed within each wheel and receives electrical energy from within the downhole tractor tool body.

In an embodiment, a method is provided for conveying a bottom hole assembly across a wellbore obstruction. The method comprising, deploying a bottom hole assembly including a downhole tractor within a wellbore; activating the downhole tractor to tractor the bottom hole assembly to an obstruction; deploying one or more arms of the tractor and activating one or more motors to power a first and second drive wheel disposed on distal ends of a linkage secured to each tractor arm; engaging the obstruction with the first downhole wheel; the first downhole wheel traversing all or part of the obstruction; engaging the obstruction with the second drive wheel and traversing part of the obstruction; the second drive wheel traversing the obstruction; continuing to tractor the bottom hole assembly such that each arm and associated linkage has passed across the obstruction; continuing to tractor the bottom hole assembly such that the bottom hole assembly crosses the obstruction.

FIG. 1. represents a downhole tool which comprises several tool modules. Module 1, a cable head, is connected to a hydraulic module 2. Hydraulic module 2 comprises an electrical motor 8 which powers a hydraulic pump 9. Pump 9 pumps hydraulic fluid into hydraulic line 14 which is routed through heat exchange section 3; through motor section 4, which contains electrical motor 10; through electronics section 5, which contains motor controller 12; through motor section 6, which contains electrical motor 11 and into accumulator section 7. Once hydraulic line 14 enters accumulator section 7, it is routed into the opposite direction and returned by hydraulic return line 13, through the electrical motor 11 in motor section 6; through motor controller 12 of electronics section 5; through the electrical motor 10 in motor section 4; through heat exchange section 3 and into hydraulic module 2, to the return port of hydraulic pump 9. As hydraulic fluid is pump through the electrical motors 10 and 11, heat is transferred to the hydraulic fluid which passes through. Once the hydraulic fluid enters heat exchange section 3, heat is transferred to the ambient wellbore environment as represent by curved arrows 16 FIG. 1. Hydraulic module 2 also provides hydraulic fluid via hydraulic line 15 to motor sections 4 and 6 for hydraulic actuation purposes. Additionally, in FIG. 1, the example placement of several parameter sensors 73, is shown.

Figure 2:
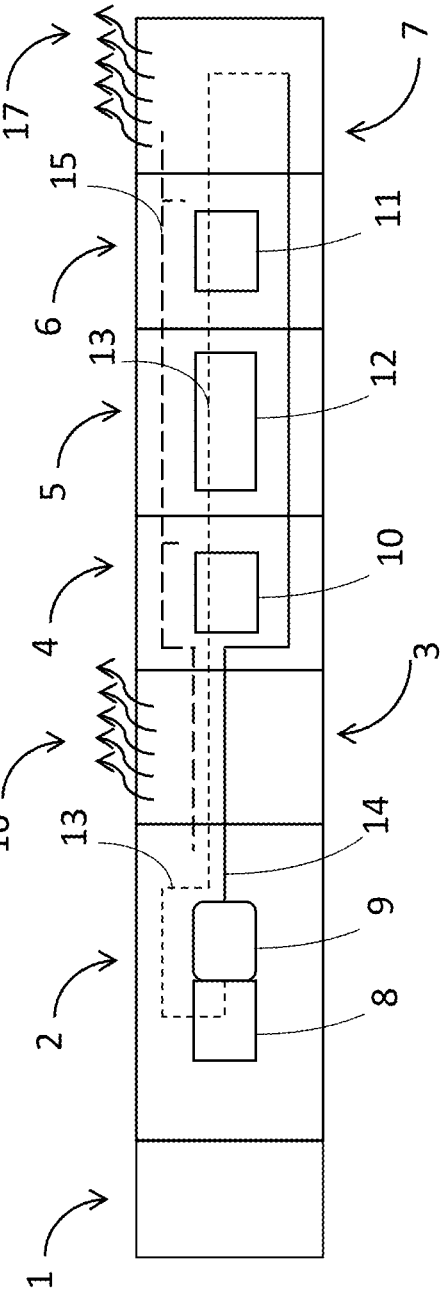
FIG. 2 represents a downhole tool which comprises several tool modules. Together the modules compose an active cooling system for cooling components in the downhole tool. This downhole tool comprises and additional heat exchanging module.

In a second embodiment represented by FIG. 2, the accumulator section 7 also functions as a heat exchange section to further cool hydraulic fluid to be pumped through electrical motors 10 and 11, and motor controller 12. Heat exchange to the ambient wellbore environment is represented by curved arrows 17. The tool modules described in FIGS. 1 and 2 may also be housed in a common housing as represented by FIG. 3.

A hydraulic control block 18 in FIG. 4, facilitates the control of the hydraulic line 14 as well as the hydraulic line 15 for actuation of various mechanisms. In the case of a tractor, actuation control of arms or linkages which apply radial force to the wellbore wall.

Figure 5:
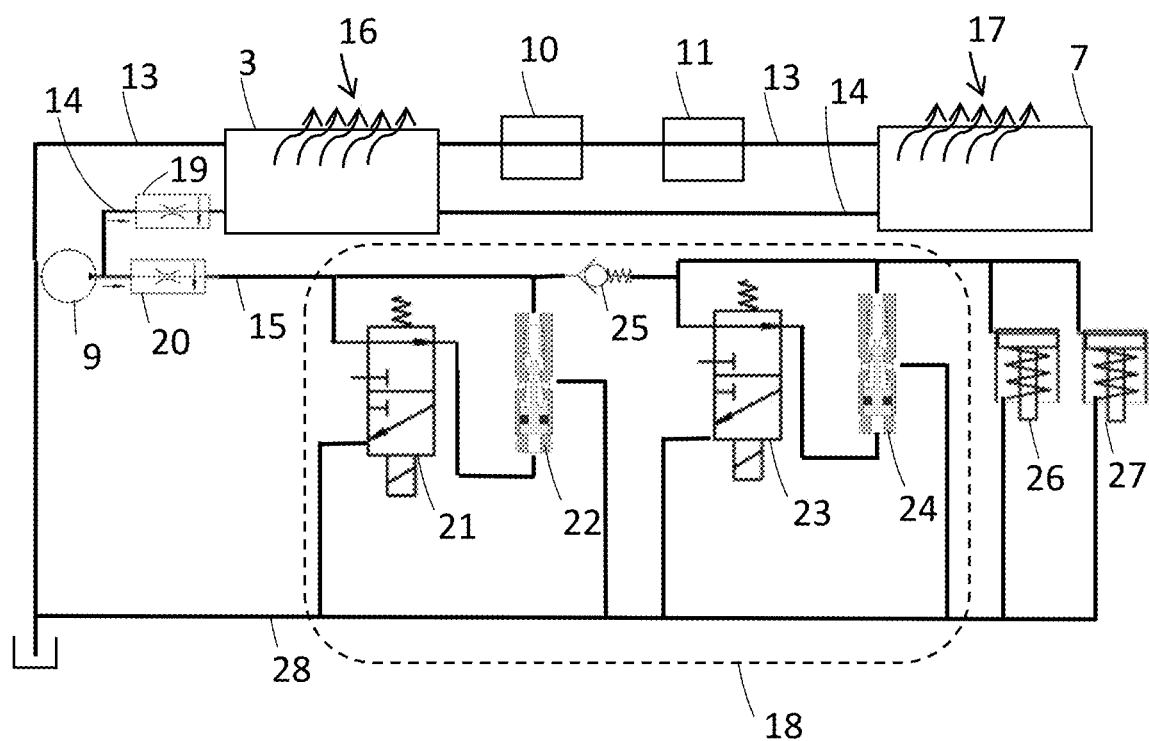
FIG. 5 shows a hydraulic schematic which could be used to implement an active cooling system into a downhole tool along with other typical hydraulic functions.

As mentioned, the hydraulic pump 9 may also be used for various actuation functions within the tool. FIG. 5. shows the hydraulic circuit of how this can be implemented. With reference to FIG. 5., pump 9 supplies hydraulic fluid to two pathways; hydraulic actuation line 15 and hydraulic cooling line 14. To ensure both lines 15 and 14 receive equal flow of hydraulic fluid; flow regulators 19 and 20 are installed on hydraulic lines 14 and 15, respectively. Flow regulators 19 and 20 are hydraulic components available in industry which ensure constant flow across a range of pressure difference across the component. They function by detecting the difference in pressure upstream from the pressure downstream through an orifice in the component, based on this pressure difference a variable orifice in the component is adjusted to increase or decrease flowrate. Therefore, when a hydraulic load is detected downstream, the variable orifice will adjust to ensure the load is supplied with constant flow as though there were no load. Flow from line 15 enters hydraulic control block 18 which is comprised of two normally open solenoid valves 21 and 23, two pilot operated check valves 22 and 24; and check valve 25. When solenoid valve 22 is un-energized, pilot operated check valve 22 is piloted and flow from hydraulic line 15 is dumped to the sump line 28 which is also the low pressure ambient hydraulic fluid inside the downhole tool. When solenoid valve 22 is energized, pilot operated check valve 22 is not piloted and flow from hydraulic line 15 is checked at the piloted operated check valve 22 and flow from hydraulic line 15 flows through check valve 25 to solenoid valve 23 and pilot operated check valve 24. If normally open solenoid valve 23 is energized, pilot operated check valve 24 will be checked and flow from hydraulic line 15 will flow to actuation pistons 26 and 27. Actuation pistons 26 and 27 may be actuation pistons for tractor arms or linkages or for other downhole tools. If it is desired to reduced pressure applied to actuation pistons 26 and 27, normally open solenoid valve 23 may be de-energized and to pilot, pilot operated check valve 24 and dump hydraulic fluid from the bores of actuation pistons 26 and 27 to the sump line 28 which is also the low pressure ambient hydraulic fluid inside the downhole tool. Flow from line 14 enters heat exchange section 3, passed electric motors 10 and 11 and into heat exchange section 7. Heat from the hydraulic fluid is transferred to the ambient wellbore as indicated by 17, flow continues into hydraulic return line 13, through electrical motor 11 and electrical motor 10 and into heat exchange section 3 where heat is further transferred to the ambient wellbore environment as indicated by 16. Flow then continues out of heat exchange section 3 by hydraulic return line 13 and to the return ports of pump 9. The embodiment of the cooling and actuation circuit shown in FIG. 5 allows for continuous cooling with the ability to maintain and control hydraulic pressure applied to actuation pistons 26 and 27. Normally open solenoid 21 pilots, pilot operated check valve 22 thereby allowing continuous flow for cooling to hydraulic line 14 without affecting actuation pistons 26 and 27.

Electrical motors 10 and 11, may in other embodiments reside in the arm or in the wheel of a tractor motor.

Additionally, in FIG. 5, the example placement of several parameter sensors 73, is shown.

Figure 6:
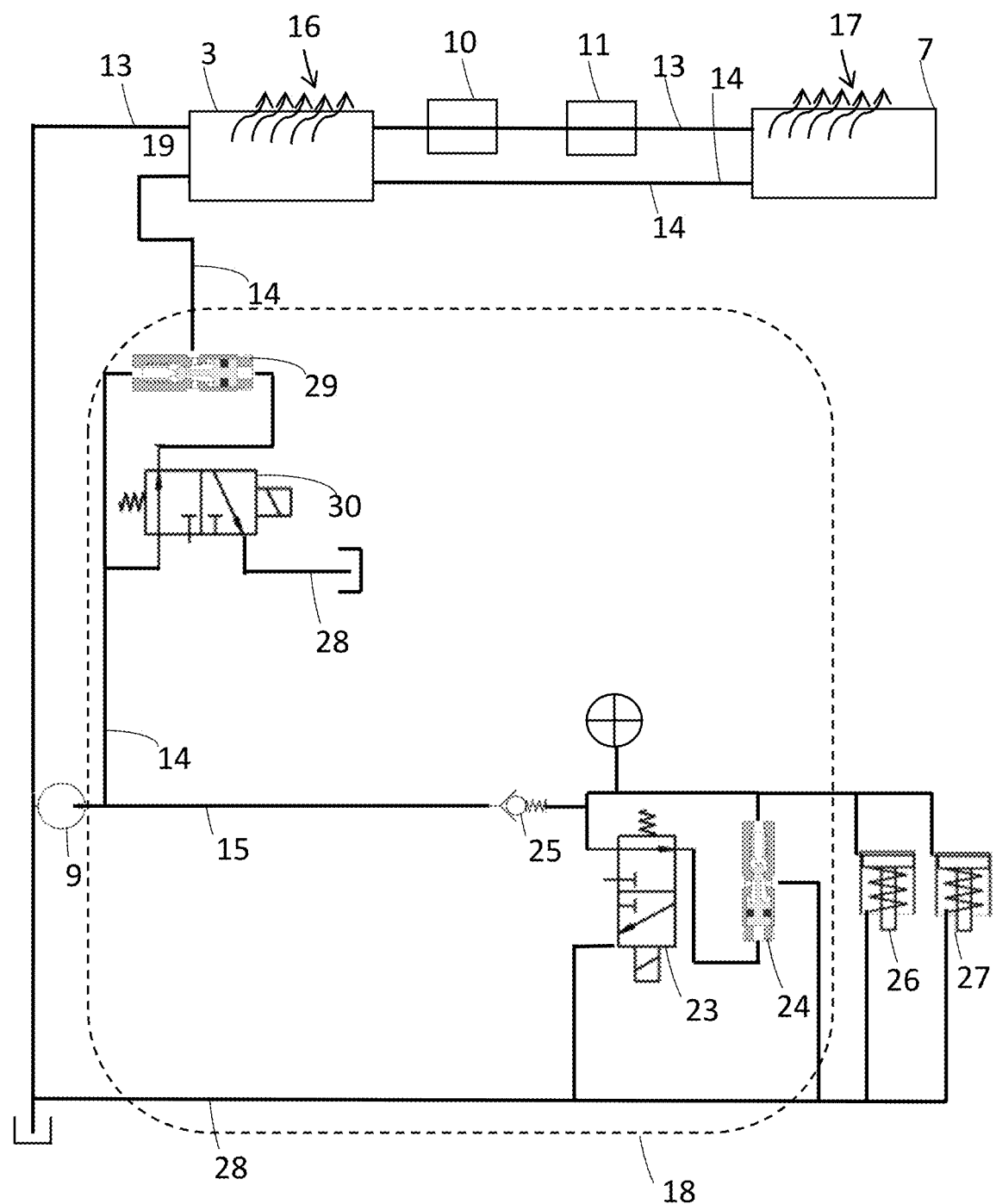
FIG. 6 shows a hydraulic schematic which could be used to implement an active cooling system into a downhole tool along with other typical hydraulic functions. This schematic allows the active cooling side of the circuit to be controlled on demand.

In a preferred embodiment of the hydraulic control circuit, represented in FIG. 6, solenoid valve 21 and pilot operated check valve 22 is eliminated. Flow regulators 19 and 20 are eliminated and normally open solenoid valve 30 and pilot operated check valve 29 are added to the cooling, hydraulic line 14 side of the circuit. When it is desired to actuate actuation pistons 26 and 27, hydraulic fluid from hydraulic line 15 is pumped and flows through check valve 25. When normally open solenoid valve 23 is energized, pilot operated check valve 24 is not piloted and flow is checked at pilot operated check valve 24 to flow into and pressurize actuation cylinders 26 and 27. Fluid in actuation cylinders 26 and 27 is held in the cylinders by energized solenoid valve 23, un-piloted check valve 24 and check valve 25. For hydraulic fluid to flow into hydraulic line 15, normally open solenoid valve 30 is energized to check flow at pilot operated check valve 29 and block hydraulic fluid from flowing to heat exchange section 3. Once actuation cylinders 26 and 27 are at the desired pressure, normally open solenoid valve 30 is de-energized to allow hydraulic fluid to flow through pilot operated check valve via hydraulic line 14 to heat exchange section 3, passed electric motors 10 and 11 and into heat exchange section 7. Heat from the hydraulic fluid is transferred to the ambient wellbore as indicated by 17, flow continues into hydraulic return line 13, through electrical motor 11 and electrical motor 10 and into heat exchange section 3 where heat is further transferred to the ambient wellbore environment as indicated by 16. Flow then continues out of heat exchange section 3 via hydraulic return line 13 and to the return ports of pump 9. Normally open solenoid valve 30, pilot operated check valve 29, normally open solenoid valve 23, pilot operated check valve 24, and check valve 25, may be packaged in hydraulic control block 18. The advantage to this embodiment of the control circuit over the embodiment described by FIG. 5, is that hydraulic power is not wasted by circulating through pilot operated check valve 22 in FIG. 5 once desired pressure in actuation cylinders 26 and 27 is achieved. Rather, with the preferred embodiment FIG. 6, once desired pressure in actuation cylinders 26 and 27 is achieved, all available hydraulic power can be used for the cooling side of the circuit by hydraulic line 14.

Additionally, in FIG. 6, the example placement of several parameter sensors 73, is shown.

Figure 7:
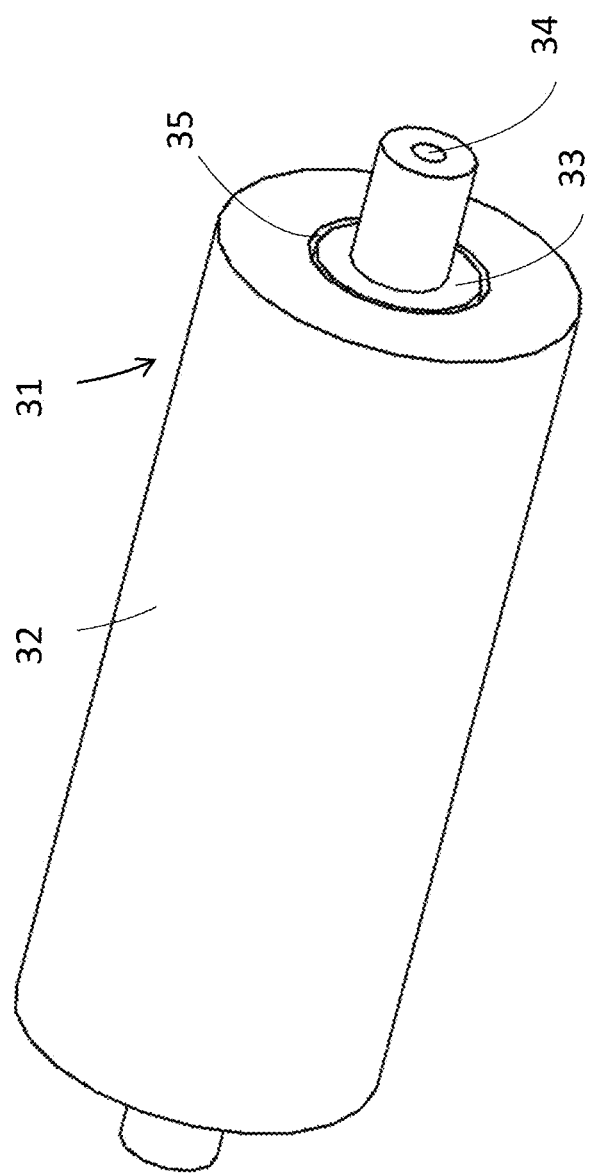
FIG. 7 shows an electrical motor and possible flow paths for cooling the electrical component.

In all embodiments described above, flow through electrical motors 10 and 11 as shown by motor 31 in FIG. 7, may flow through a rotor passageway 34 of rotor 33, around or parallel to the long axis of stator 32, through an annular space 35 created by rotor 33 and the inside diameter of stator 32, or any combination of, including all of the above described flow paths.

Figure 8A:
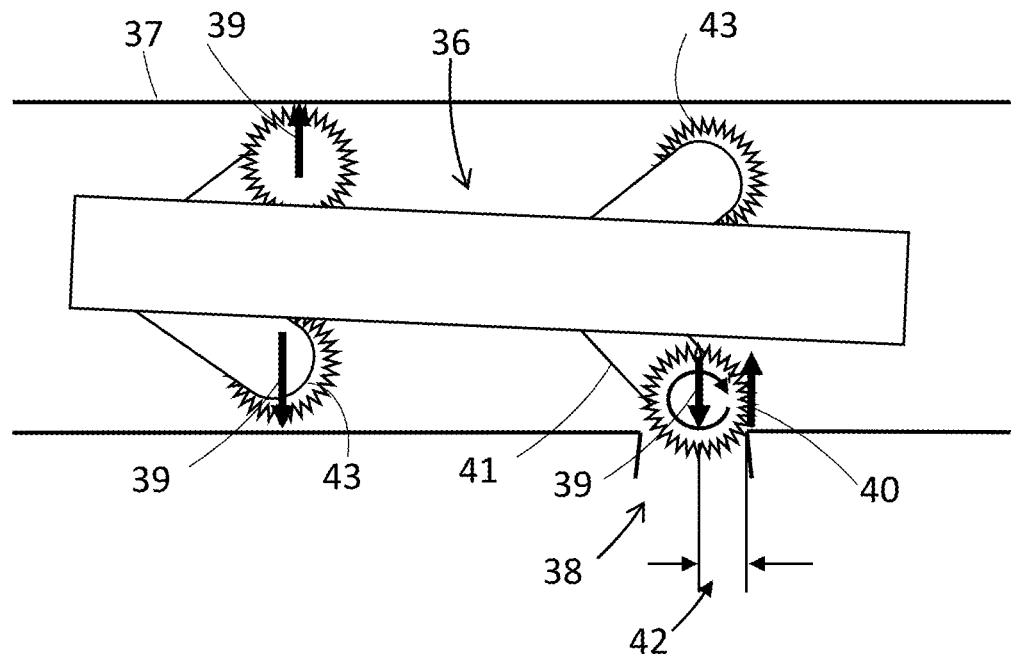
FIG. 8A shows a wheeled downhole tractor section in which one wheel has entered a perforation hole in the wellbore. The figure also shows the forces present at the wheels of the tractor.
Figure 8B:
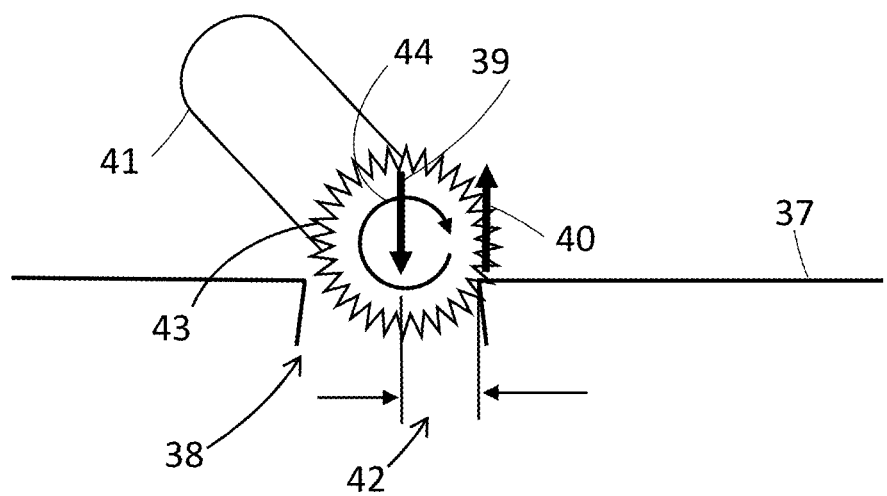
FIG. 8B shows a close-up view of the tractor wheel of FIG. 8A entering in the perforation hole and the forces acting upon the wheel.

FIG. 8A represents side-by-side arm tractor 36 with one wheel per arm moving inside a wellbore 37 with a perforation hole 38. FIG. 8B represents a close-up of a wheel 43 at the end of an arm 41 entering a perforation hole 42. When a wheel 43 enters into perforation hole 38 and impacts the downhole edge of perforation hole 38, a reaction force 40 is exerted radially towards the main center of the wellbore 37. The reaction force 40 is equivalent to the radial force 39 applied by the tractor arm to the wellbore for traction. The reaction force is applied at a distance 42 from the center of wheel 43. This creates a moment which counteracts the torque 44 at the wheel, which is required for movement of the tractor. Radial forces for side-by-side arm tractors may often approach several hundred pounds making the moment created by the reaction force 40 at distance 42, substantial. If the moment is greater than the torque 44 that can be applied at the wheel 43, the tractor will stall resulting in lost time and reduced operational efficiency.

Figure 9A:
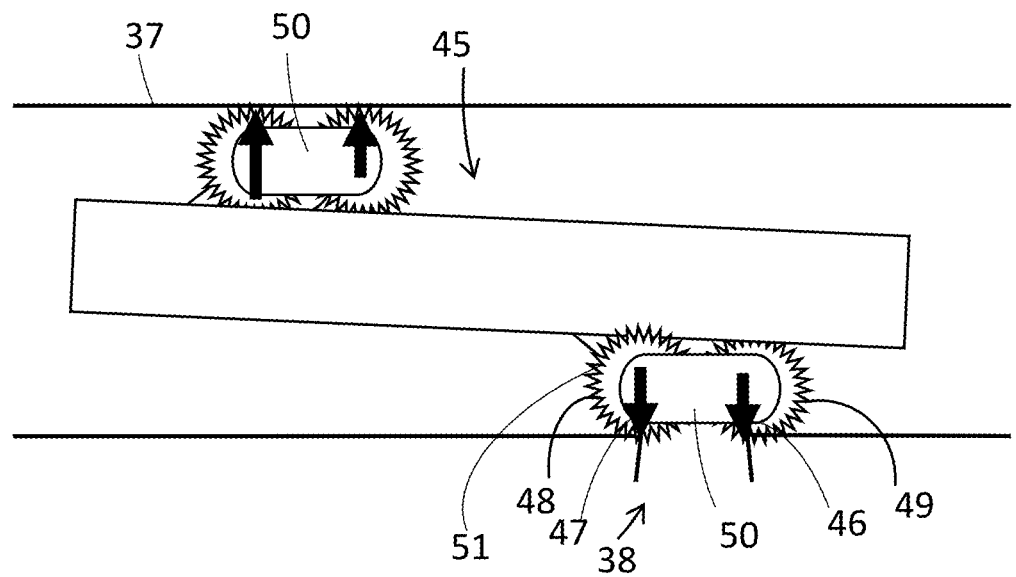
FIG. 9A shows a wheeled downhole tractor section with two wheels per in-line arm which is traversing a perforation hole in the wellbore. The figure also shows the forces present at the wheels of the tractor.
Figure 9B:
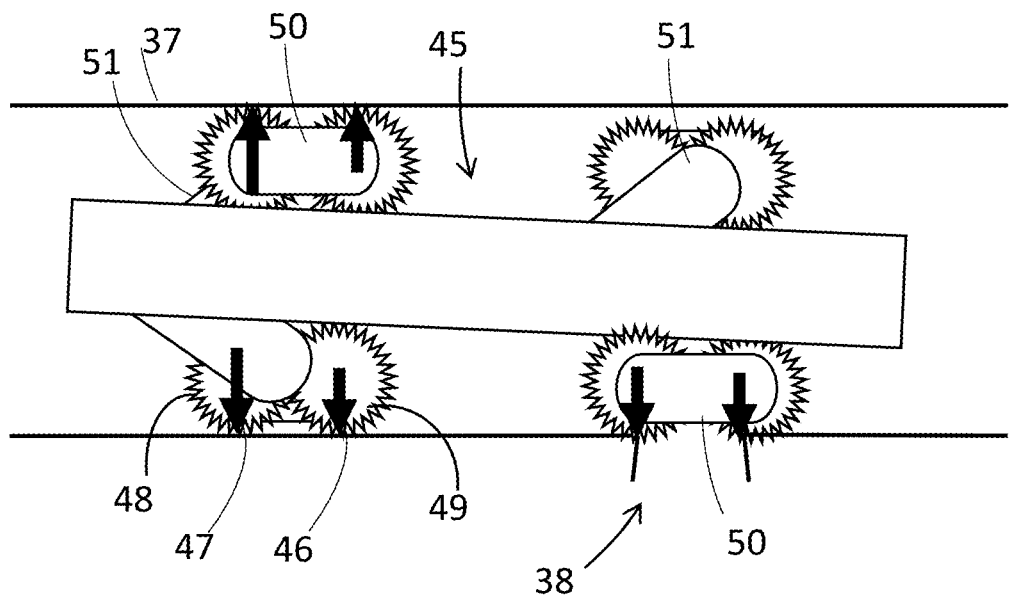
FIG. 9B shows a wheeled downhole tractor section with two wheels per side-by-side arm which is traversing a perforation hole in the wellbore. The figure also shows the forces present at the wheels of the tractor.

Improving upon the state of the art by incorporating an additional wheel per arm offers significant advantages for traversing perforation holes and other obstacles within the wellbore. Representative in-line arm tractor section 45 of FIG. 9A is one embodiment and the advantage of multiple wheels per arm is evident as it traverses perforation hole 38. When the downhole wheel 49 enters the perforation hole 38, the up-hole wheel 48 is still within the wellbore 37 assisting the downhole wheel to traverse the perforation hole 38. When the up-hole wheel 48 is in the perforation hole, the downhole wheel 49 has already traversed the perforation hole 38 and able to assist the up-hole wheel 48 to traverse the perforation hole 38. In a second embodiment FIG. 9B, a side-by-side arm tractor with two wheels per arm is traversing a perforation hole 38.

Figure 10:
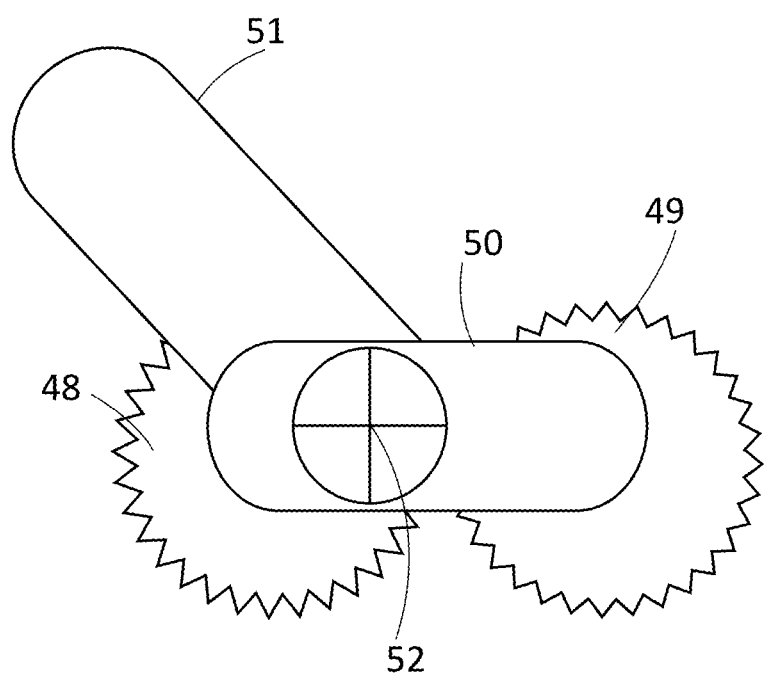
FIG. 10 shows a close-up view of a tractor arm mechanism
Figure 11B:
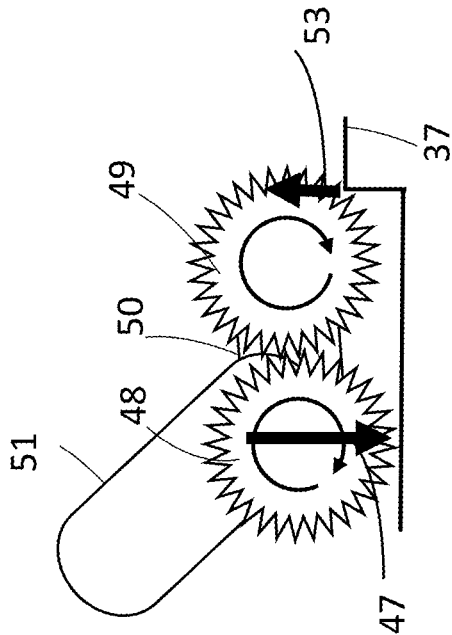
FIG. 11A through FIG. 11D show a sequence of events of a tractor arm mechanism with two wheels leading up to and passed a change in the wellbore profile.
Figure 11D:
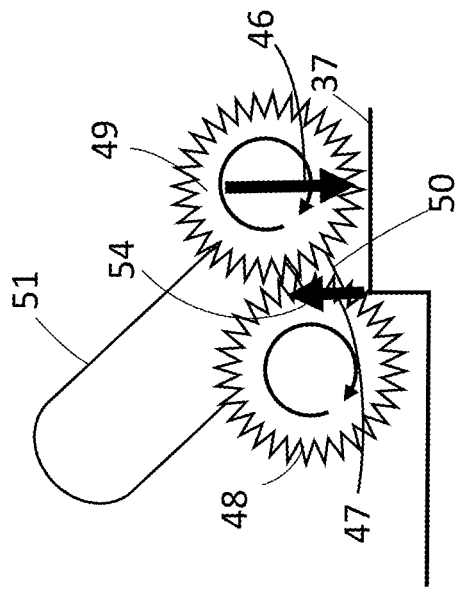
Figure 11A:
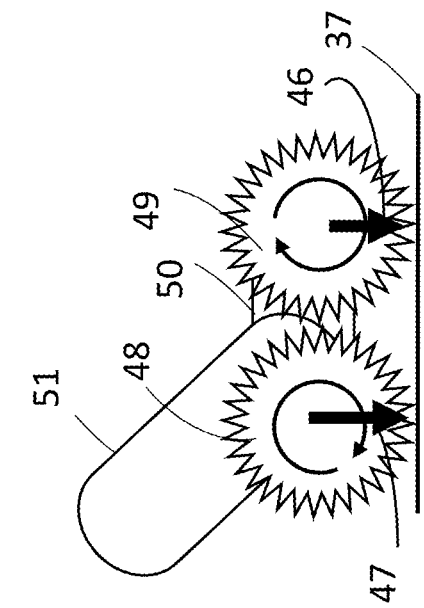
Figure 11C:
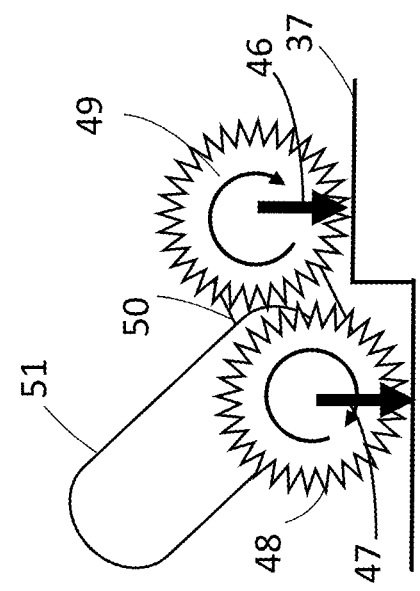

For clarity in FIG. 10, a tractor arm mechanism is shown disconnected from the tractor tool body. An arm 51 is connected to linkage 50 at pivot point 52. The connection interface allows linkage 50 to partially rotate about the end of arm 51. Pivot point 52 is up-hole from the center of linkage 50. Wheels 48 and 49 reside at each end of linkage 50. Wheel 48 is mounted on linkage 50 at a distance from pivot point 52 and wheel 49 is mounted on linkage 50 at a greater distance from pivot point 52. In FIG. 11A through FIG. 11D, the tractor arm mechanism of FIG. 10, is shown without the tractor body in a sequence of steps traversing a change in the wellbore 37 profile.

Radial force is applied to wellbore 37 for traction by arm 51 to linkage 50 and thereby to drive wheels 48 and 49. Due to the off-center connection of arm 51 to linkage 50, the forces exerted by each wheel to the wellbore 37, on a uniform surface, are of differing magnitude as represented by large arrow 47 and smaller arrow 46.

When the tractor arm mechanism interacts with a step in the wellbore 37 a reaction force 53 is exerted which creates a moment about pivot point 52 causing an increase in force 47. This relationship is ideal to lift wheel 49 on top of the step in the wellbore because additional traction is now available to wheel 48 due to the now increased radial force 47 of FIG. 11B. Once wheel 49 is on top of the step, radial forces 47 and 46 are closer to equal magnitudes due the effective wellbore axial distance from one another. As the tractor mechanism continues downhole and wheel 48 impacts the step in the wellbore 37, a reaction force 54 is exerted which creates a moment about pivot point 52 causing an increase in force 46. This relationship is ideal to lift wheel 48 on top of the step in the wellbore because additional traction is now available to wheel 49 due to the now increased radial force 46 of FIG. 11D. It is clear that by implementing greater than two wheels per arm, similar advantages may be obtained.

Figure 12A:
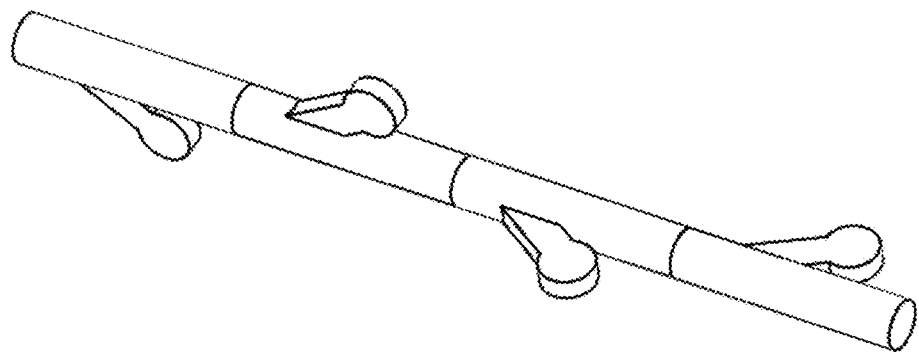
FIG. 12A represents a tractor with in-line arms with every two arms orthogonal to the next.
Figure 12B:
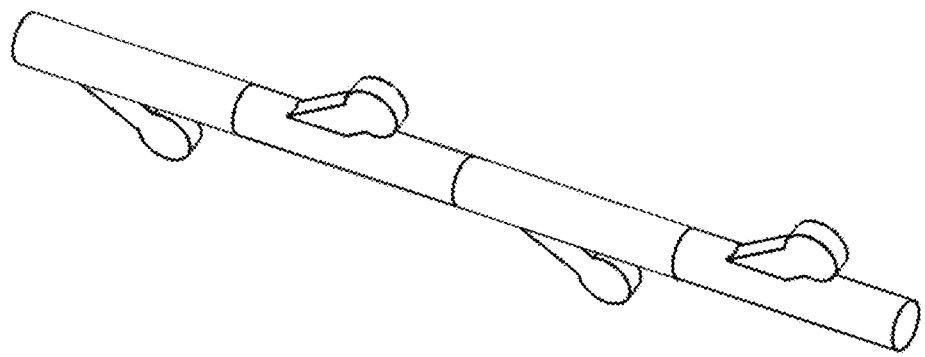
FIG. 12B represents a tractor with in-line arms.
Figure 13:
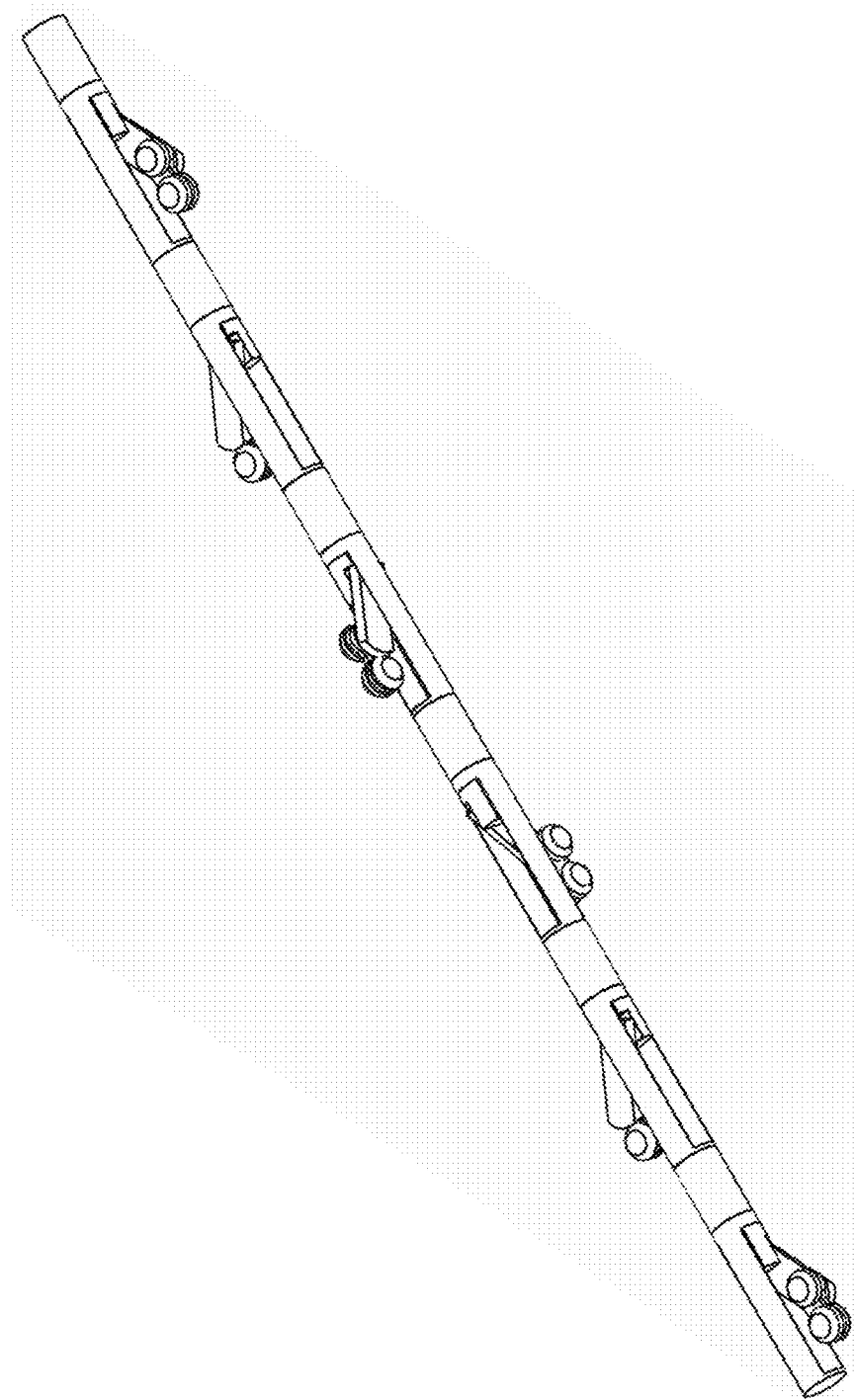
FIG. 13 shows a tractor with the arm mechanism of FIG. 11, in an in-line arm configuration.
Figure 14:
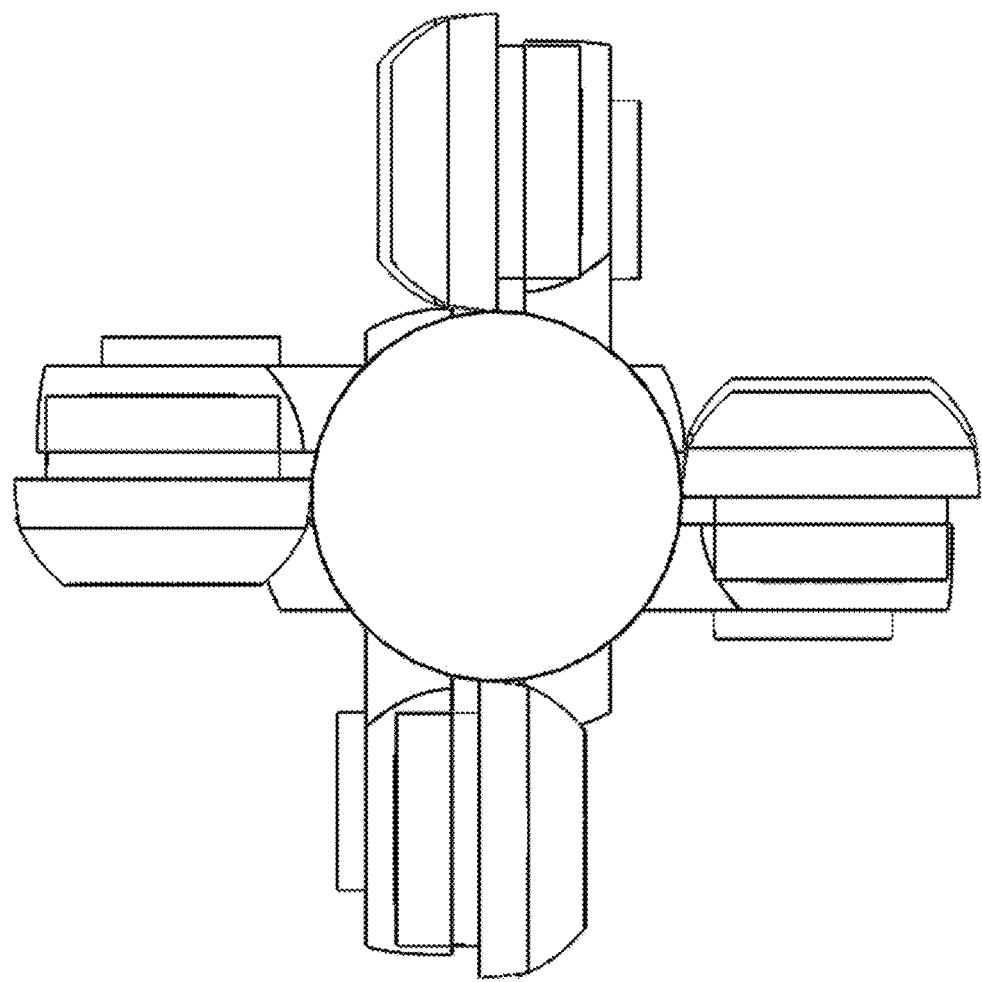
FIG. 14. shows and axial view of the tractor in FIG. 13.
Figure 15:
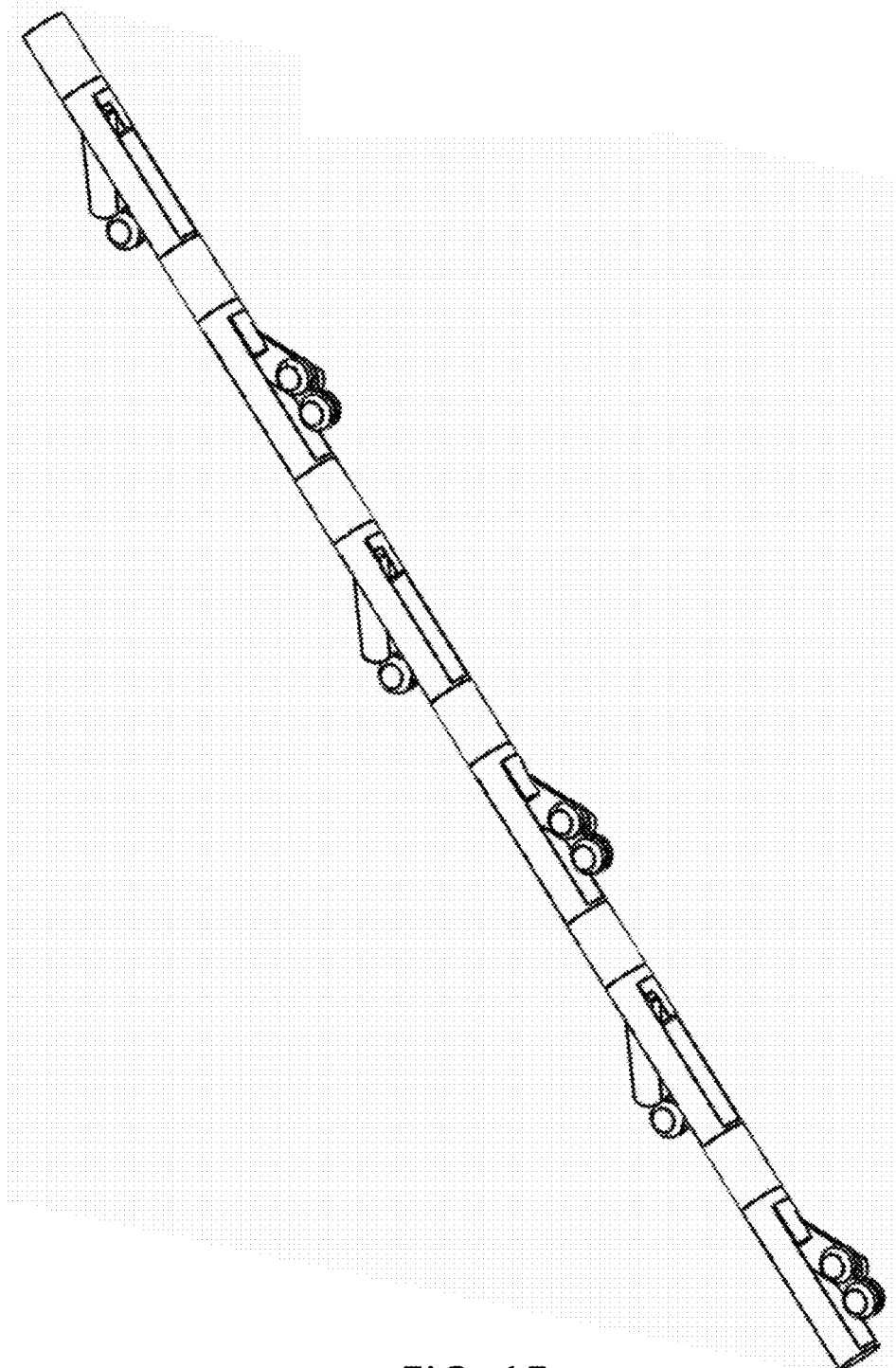
FIG. 15 shows a tractor with the arm mechanism of FIG. 11, in an in-line arm configuration.
Figure 16:
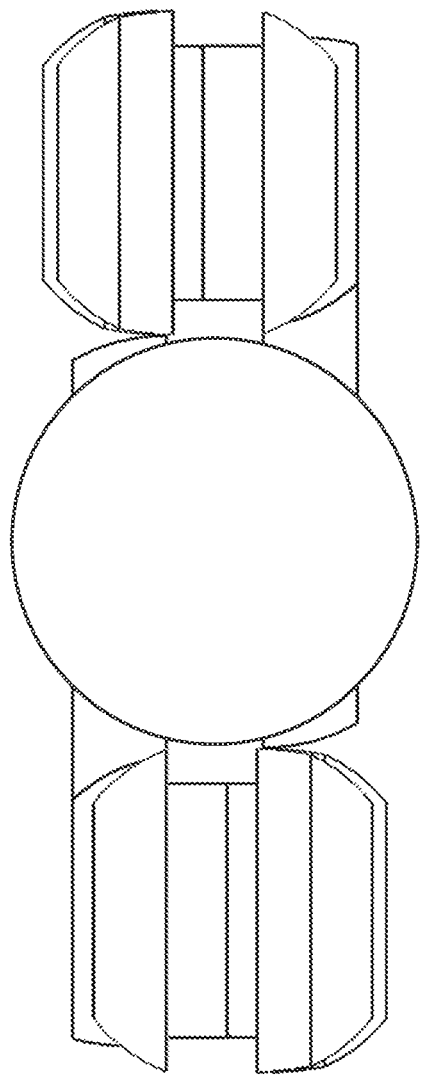
FIG. 16. shows and axial view of the tractor in FIG. 15.

There are several configurations of in-line arm tractors, two of which are shown in FIG. 12A and FIG. 12B. An implementation of the tractor arm mechanism of FIG. 10 in the configuration shown in FIG. 12A is shown in FIG. 13 as the preferred embodiment. An axial view of the tractor of FIG. 13 is shown in FIG. 14. An implementation of the tractor arm mechanism of FIG. 10 in the configuration shown in FIG. 12B is shown in FIG. 15. An axial view of the tractor of FIG. 15 is shown in FIG. 16.

Figure 17:
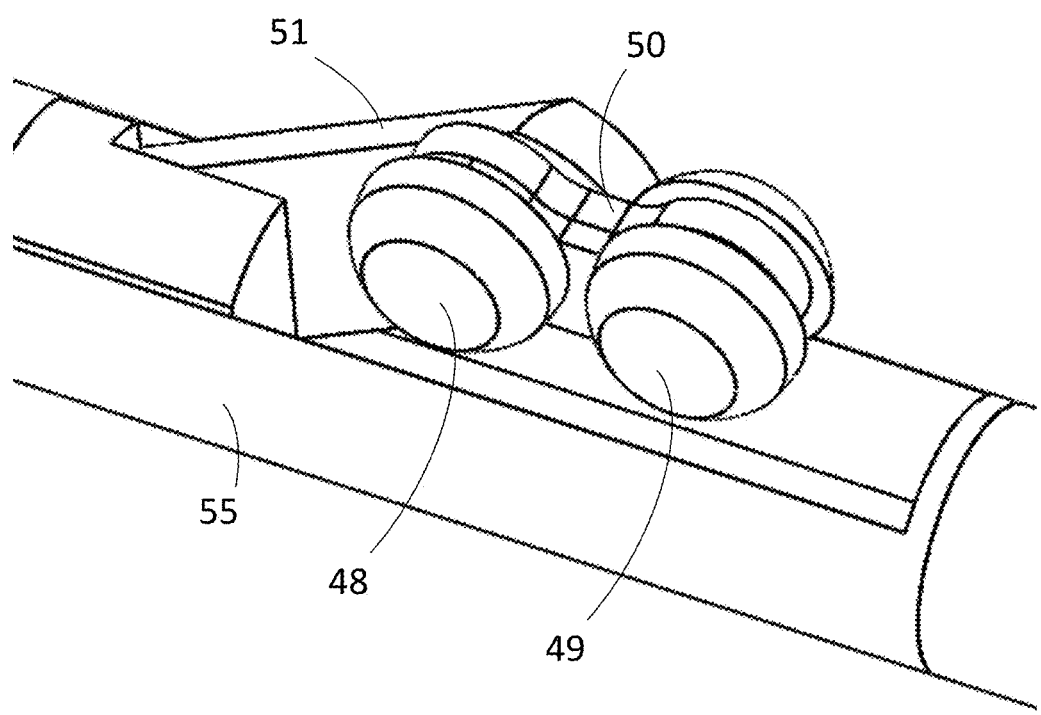
FIG. 17. shows a close-up view of the tractor mechanism implemented in a tool body.

A close-up view of the tractor mechanism of FIG. 10 mounted inside a tool body 55 is shown in FIG. 17. A close-up view of another embodiment of the tractor mechanism of FIG. 10 mounted inside a tool body 55 is shown in FIG. 18A and FIG. 18B.

Figure 18A:
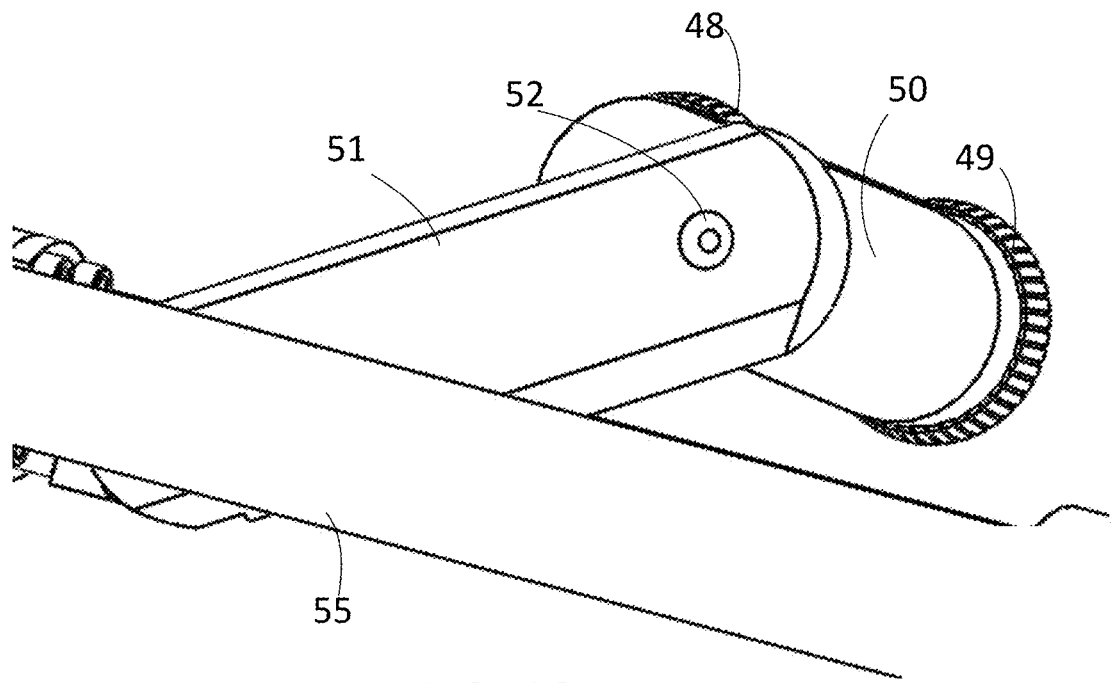
FIG. 18A and FIG. 18B show a close-up view of another embodiment of the tractor arm mechanism.
Figure 18B:
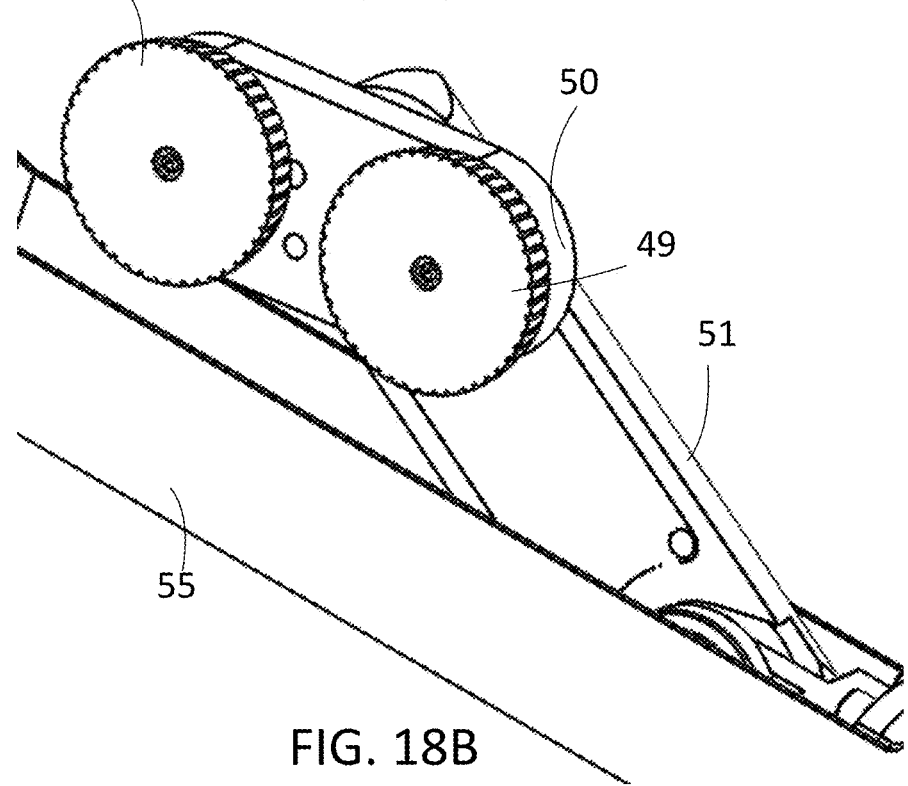
Figure 19A:
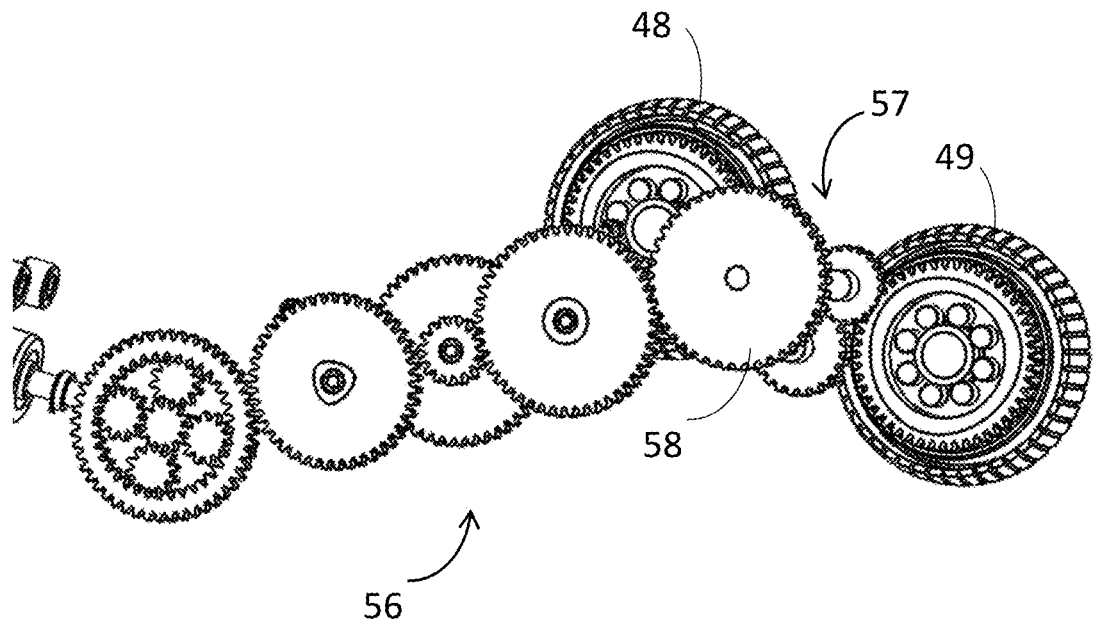
FIG. 19A and FIG. 19B show a close-up view of the drive mechanism of an embodiment of the tractor mechanism in FIG. 18A and FIG. 18B.
Figure 19B:
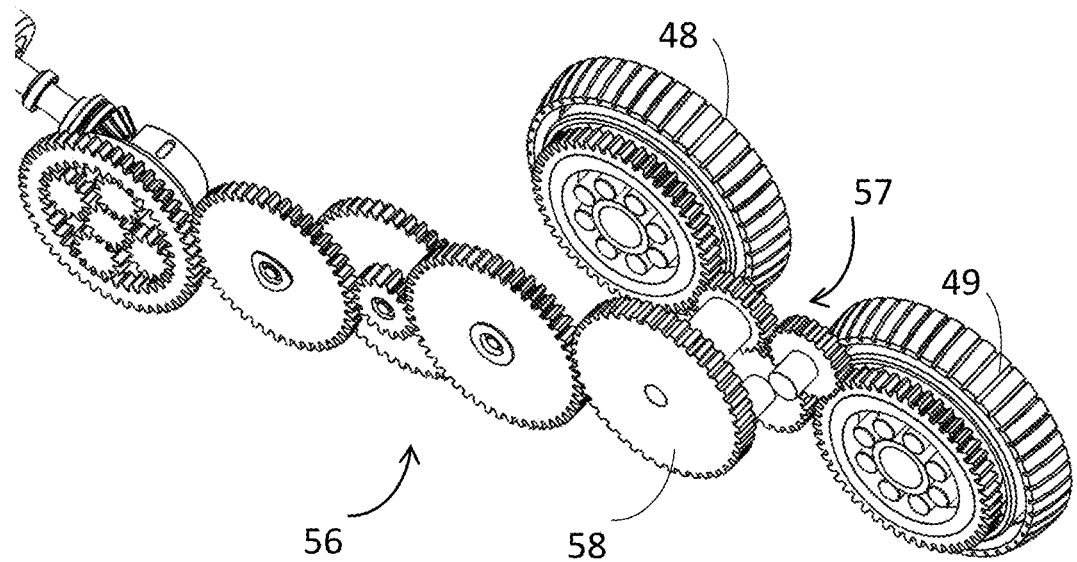
Figure 20:
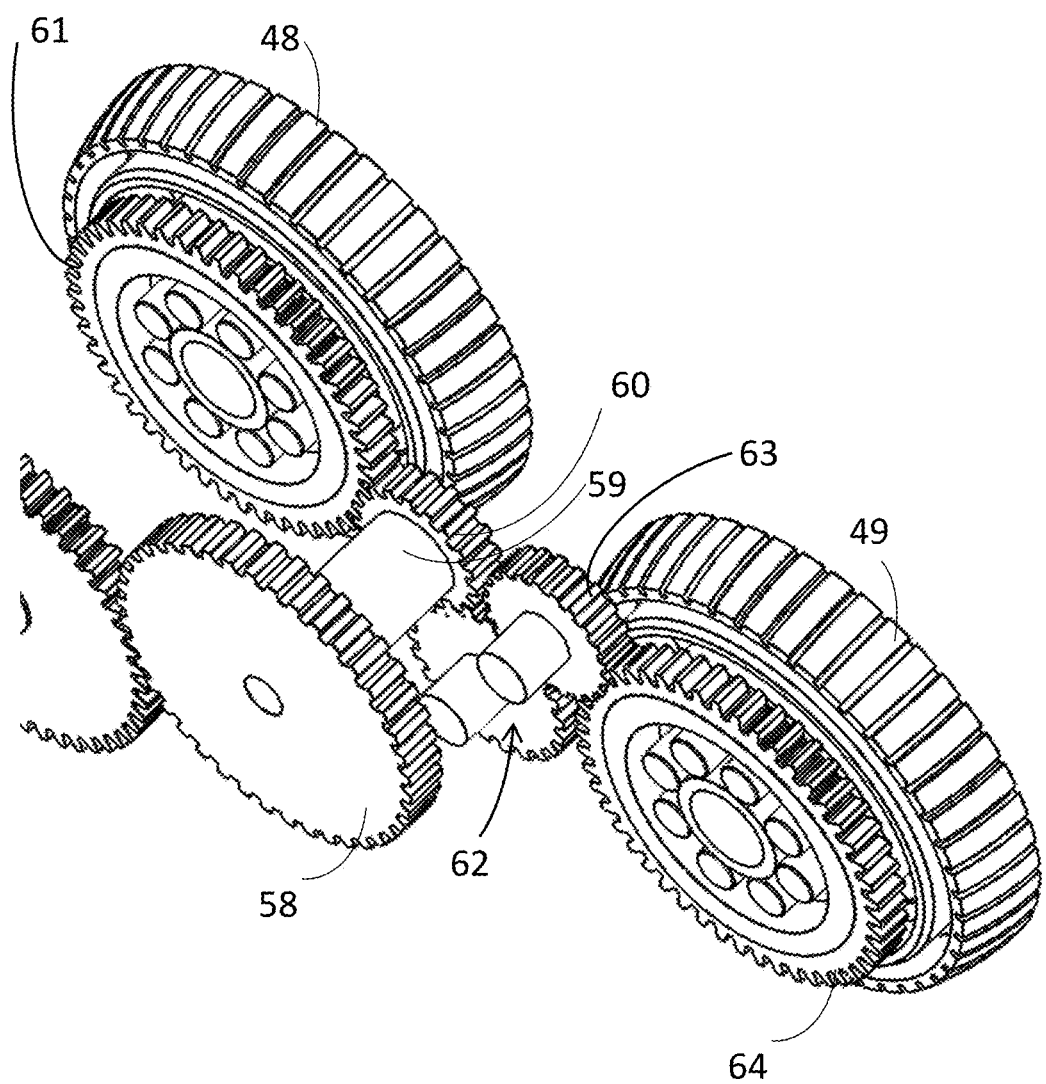
FIG. 20 shows a close-up view of a particular portion of the gear train in FIG. 19A and FIG. 19B.

In the embodiment of FIG. 18A and FIG. 18B, mechanical power is supplied by a motor inside the tool body 55, to a gear train 56 which resides inside the arm 51. See FIG. 19A and FIG. 19B with 51 and 50 hidden. Gear 58 of gear train 56 has an integrated shaft 59 which is integrated to gear 60 of gear train 57. Gear 60 transmits power to the gear 61 which drives wheel 48. Gear 60 also drives idler 62 which drives gear 63. Gear 63 drives gear 64 which drives wheel 49. See FIG. 20. Gears 60, 61, 62, 63 and 64 reside inside linkage 50. Shaft 59 transmits power from within arm 51 to within linkage 50.

Figure 21:
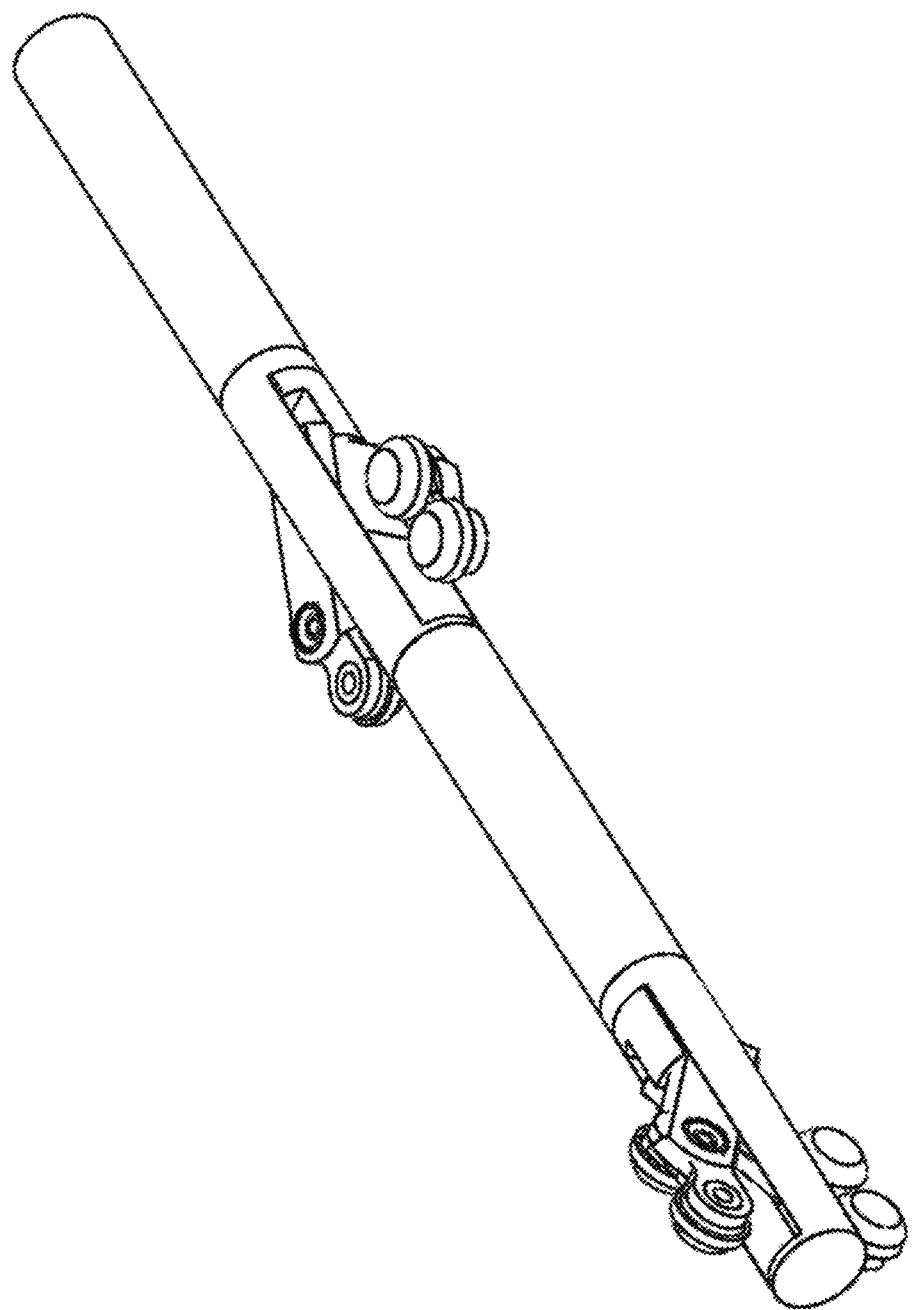
FIG. 21 shows an embodiment of the tractor mechanism of FIG. 17 and FIG. 11 in a side-by-side arm configuration.

An embodiment of the tractor arm mechanism of FIG. 10 implemented in a side-by-side arm configuration is shown in FIG. 21.

Figure 22:
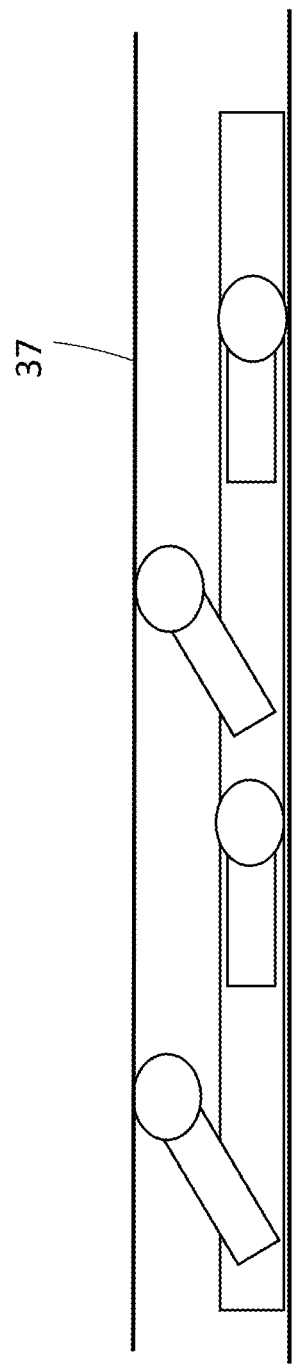
FIG. 22 is representation of an in-line arm tractor which failed to centralize.

Unlike side-by-side arms that are mechanically linked. The actuation of tractor arms in an in-line arm configuration must be controlled differently to ensure adequate centralization of the tractor in the wellbore. FIG. 22 shows an in-line arm tractor system which failed to lift the tool to centralize in the wellbore. When the hydraulic fluid from a hydraulic pump is supplied to the actuators, one for each arm, on a common hydraulic bus, fluid from the pump only actuates those arms easiest to move because they were not loaded by the weight of the tractor or conveyed loads.

One method for eliminating the problem of centralizing an in-line arm tractor is to charge a high volume-high pressure accumulator and release the accumulated hydraulic energy into the actuation cylinders of the tractor arms. This may overcome the resting inertia of the tractor tool resting on the wellbore such that each actuation cylinder receives hydraulic fluid to adequately centralize the tractor tool.

Figure 23:
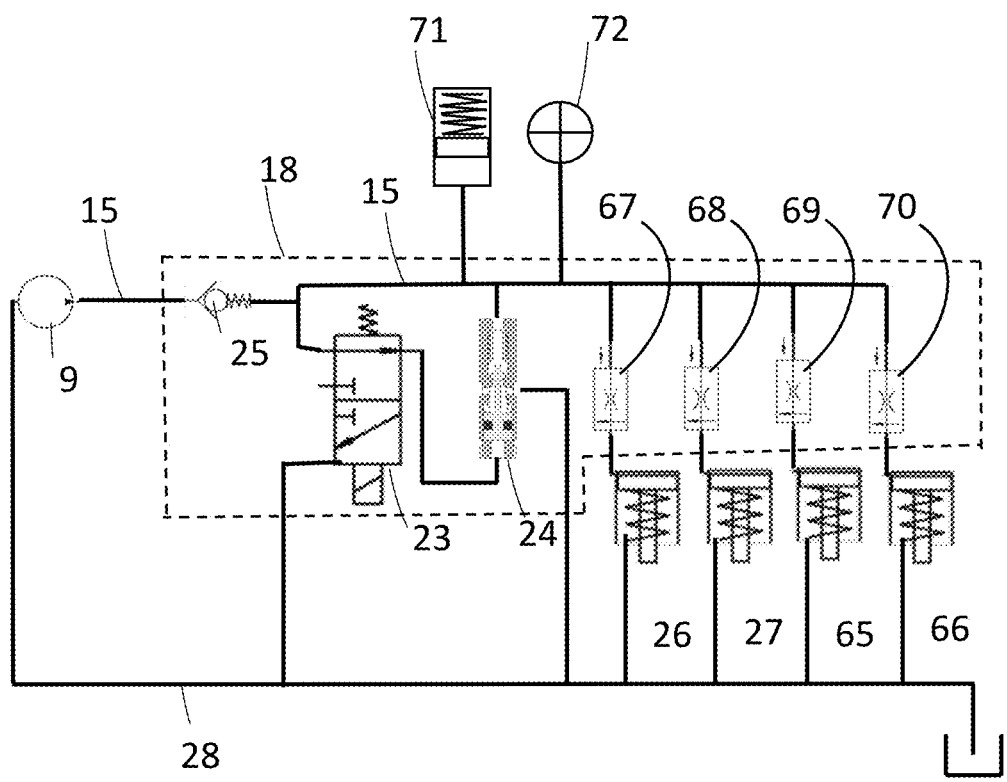
FIG. 23 is a hydraulic schematic of a tractor actuation system.

A preferred solution is shown by the hydraulic circuit in FIG. 23 in which hydraulic fluid from hydraulic line 15 is pumped and flows through check valve 25. When normally open solenoid valve 23 is energized, pilot operated check valve 24 is not piloted and flow is checked at pilot operated check valve 24 to flow into and pressurize actuation cylinders 26, 27, 65 and 66; through flow regulators 67, 68, 69 and 70, respectively. Fluid in actuation cylinders 26, 27, 65, and 66 is held in the cylinders by energized solenoid valve 23, un-piloted check valve 24 and check valve 25. Flow regulators 67, 68, 69 and 70 provide constant flow from each of their inlets to each of their outlets for varying pressure differences between flow regulators inlet and outlet. This ensures that each actuation cylinder, connected to each arm receives an equal volume of hydraulic fluid, thereby ensuring that the in-line arm tractor centralizes in the wellbore no matter its resting position. Numerous actuation cylinders may be employed in a tractor; greater than the number represented in FIG. 23. A high-pressure accumulator 71 may be connected to the hydraulic line 15. When pressure is held in the actuation cylinders and changes in wellbore profile cause the hydraulic fluid volume in an actuation cylinder to change, the accumulator volume will adjust to compensate for the actuation cylinder volume change by receiving hydraulic fluid from an actuation cylinder or delivering hydraulic fluid to an actuation cylinder, thereby not requiring the hydraulic fluid in actuation cylinders to be dumped to the sump line 28 by energizing solenoid valve 23. A pressure gauge 72 may be connected to the hydraulic line 15 to monitor pressure in the actuation cylinders.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment. The term "seal", as in the engaging of a sealing element to a borehole, is used for the purpose of describing particular embodiments.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A downhole tractor mechanism for deployment via a wireline in a subterranean formation comprising:
   an arm radially extendable from a tractor tool body;
   the tractor tool body connected to the wireline;
   a linkage having a single pivot point, a first free end and an opposing second free end, and mounted to an extendable end of the arm at the pivot point;
   a first drive wheel mounted to the linkage at the first free end and a second drive wheel mounted to the linkage at the second free end;

the distance from the pivot point to the first free end differing from the distance from the pivot point to the second free end;

the first and second drive wheel disposed to contact the inside of a tubular and apply a traction force thereto;

a gear train within the arm;

the gear train within the arm arranged to transmit power to a gear train within the linkage;

the gear train within the linkage arranged to transmit power to the drive wheels.

2. The mechanism of claim 1, wherein the first drive wheel comprises an electric motor.

3. The mechanism of claim 1, further comprising a gear differential within the gear train within the linkage.

4. The mechanism of claim 3, wherein the gear differential is a limited slip differential.

5. A downhole tractor mechanism comprising:

an arm radially extendable from a tractor tool body;

a linkage having a single pivot point, a first free end and an opposing second free end, and mounted to an extendable end of the arm at the pivot point;

a first drive wheel mounted to the linkage at the first free end and a second drive wheel mounted to the linkage at the second free end;

the distance from the pivot point to the first free end differing from the distance from the pivot point to the second free end;

the first and second drive wheel disposed to contact the inside of a tubular and apply a traction force thereto;

a gear train within the arm;

the gear train within the arm arranged to transmit power to a gear train within the linkage;

the gear train within the linkage arranged to transmit power to the first and second drive wheel.

6. The mechanism of claim 5, further comprising a gear differential within the gear train within the linkage.

7. The mechanism of claim 6, wherein the gear differential is a limited slip differential.

\* \* \* \* \*